(12) United States Patent
Rowe et al.

(10) Patent No.: US 12,464,022 B2
(45) Date of Patent: Nov. 4, 2025

(54) ENDPOINT ASSESSMENT DEDUPLICATION

(71) Applicant: Ivanti, Inc., South Jordan, UT (US)

(72) Inventors: Robin Rowe, Daresbury (GB); Jack Smith, Daresbury (GB)

(73) Assignee: Ivanti, Inc., South Jordan, UT (US)

( * ) Notice: Subject to any disclaimer, the term of this patent is extended or adjusted under 35 U.S.C. 154(b) by 377 days.

(21) Appl. No.: 18/056,996

(22) Filed: Nov. 18, 2022

(65) Prior Publication Data

US 2023/0164190 A1  May 25, 2023

Related U.S. Application Data

(60) Provisional application No. 63/281,675, filed on Nov. 21, 2021.

(51) Int. Cl.
*H04L 9/40* (2022.01)

(52) U.S. Cl.
CPC ............ *H04L 63/20* (2013.01); *H04L 63/107* (2013.01); *H04L 63/108* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 9,092,616 | B2* | 7/2015 | Kumar | G06F 21/564 |
| 2007/0107043 | A1* | 5/2007 | Newstadt | H04L 63/102 |
| | | | | 726/2 |
| 2007/0143851 | A1* | 6/2007 | Nicodemus | G06F 11/3495 |
| | | | | 726/4 |
| 2010/0306176 | A1* | 12/2010 | Johnson | G06F 16/125 |
| | | | | 707/698 |
| 2010/0333177 | A1* | 12/2010 | Donley | H04L 63/1416 |
| | | | | 726/4 |
| 2011/0119517 | A1* | 5/2011 | Beeco | H04L 41/12 |
| | | | | 713/340 |
| 2013/0254833 | A1* | 9/2013 | Nicodemus | H04L 63/20 |
| | | | | 726/1 |
| 2016/0078068 | A1* | 3/2016 | Agrawal | G06F 16/215 |
| | | | | 707/692 |
| 2017/0142157 | A1 | 5/2017 | Cao et al. | |
| 2018/0101432 | A1* | 4/2018 | Algie | G06F 3/0619 |
| 2019/0190929 | A1* | 6/2019 | Thomas | H04L 43/10 |
| 2019/0190936 | A1* | 6/2019 | Thomas | H04L 63/1425 |
| 2020/0128020 | A1* | 4/2020 | Abduljaber | H04L 63/10 |

(Continued)

OTHER PUBLICATIONS

RFC 5209: Network Endpoint Assessment (NEA) (Year: 2008).*

(Continued)

*Primary Examiner* — Kaveh Abrishamkar

(57) ABSTRACT

Security compliance may be facilitated for multiple endpoints associated with a network. Multiple batch endpoint assessments may be performed. Each batch endpoint assessment of the multiple batch endpoint assessments may include receiving multiple status indicators associated with at least a subset of endpoints of the multiple endpoints. For each batch endpoint assessment of the multiple batch endpoint assessments, a status may be assigned to each endpoint of the multiple endpoints based on the plurality of status indicators. A state may be generated for each endpoint of the multiple endpoints based on the statuses assigned to the multiple endpoints.

16 Claims, 9 Drawing Sheets

(56) References Cited

U.S. PATENT DOCUMENTS

2022/0094600 A1* 3/2022 Khoo .................. H04L 41/0894
2022/0360594 A1* 11/2022 Cosgrove ............ H04L 63/1416

OTHER PUBLICATIONS

International Preliminary Report on Patentability and Written Opinion of the International Searching Authority for Application No. PCT/US2022/080236, dated May 2, 2024, 8 pages.
International Search Report and Written Opinion for Patent Application No. PCT/US2022/080236, dated Jan. 27, 2023, 13 pages.

* cited by examiner

| Endpoints 108 | First Assessment 300A | Second Assessment 300B | Third Assessment 300C | ... | Final |
|---|---|---|---|---|---|
| First Endpoint 108A | Non-Compliant 208 | Unknown 206 | Non-Compliant 208 | ... | Non-Compliant 208 |
| Second Endpoint 108B | Non-compliant 208 | Unknown 206 | Compliant 204 | ... | Compliant 204 |
| Third Endpoint 108C | Non-compliant 208 | Compliant 204 | Unknown 206 | ... | Compliant 204 |
| Fourth Endpoint 108D | Unknown 206 | Compliant 204 | Compliant 204 | ... | Compliant 204 |
| ... | ... | ... | ... | ... | ... |

FIG. 4

ENDPOINT ASSESSMENT DEDUPLICATION

CROSS-REFERENCE TO RELATED APPLICATIONS

This application is related to U.S. Provisional Application No. 63/255,360, filed Oct. 13, 2021, and U.S. patent application Ser. No. 18/046,136, filed Oct. 12, 2022. This application claims priority to and the benefit of U.S. Provisional Application No. 63/281,675, filed Nov. 21, 2021. The disclosures of these applications are incorporated herein by reference in their entireties.

FIELD

The embodiments discussed herein are related to network endpoint management and in particular to endpoint assessment and deduplication of assessment results.

BACKGROUND

The use of the electronic devices has become increasingly prevalent in modern society. Many electronic devices are configured to access and communicate via networks.

Management of the electronic devices in the networks may be facilitated by network management service software such as service management systems and endpoint management systems. Service management systems, endpoint management systems, and other network management systems may enable administration and control of the electronic devices. For instance, an endpoint management system may implement assessments of the electronic devices. The assessments might be configured to assess one or more characteristics or features of each of the electronic devices. Assessments might include whether a particular feature or setting of the electronic devices are present, functional, disabled, or enabled, for example. These assessments may be scheduled and/or automatically triggered by events.

In some conventional networks, it is difficult assess all electronic devices or all electronic devices within a particular period of time. For instance, in geographically disparate networks a first portion of the electronic devices may be in a first geographic location and a second portion of the electronic devices may be in a second geographic location, which is several time zones away from the first geographic location. Accordingly, in the geographically disparate networks, the first and second portions of the electronic devices may be active during different times. If the assessment requires the electronic devices to be active and evaluated, the endpoint management system may be unable to perform and/or complete the assessment respective to all the endpoints. These and other conventional networks may benefit from improved systems and methods of endpoint assessment and deduplication.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of the invention an embodiment includes a method of endpoint compliance evaluation and remediation. The method may be implemented in a network of endpoints having changing network communication states. The method may include performing a first batch endpoint assessment at a first time during which a first subset and a third subset of the endpoints are active, and a second subset of the endpoints is inactive. Responsive to the first batch endpoint assessment, the method may include receiving a first set of assessment indicators from one or more or each of the endpoints. The first set may include an indication of a compliance state from the first subset and the third subset that are active and an indication of a communicative state from the second subset that is inactive. The method may include generating a first device status array based on the first set. The first device status array may indicate the statuses of the endpoints at the first time. The method may include performing a second batch endpoint assessment at a second time. The second time may be during an assessment period and following the first time. The second subset and the third subset may be active at the second time and the first subset may be inactive at the second time. Responsive to the second batch endpoint assessment, the method may include receiving a second set of assessment indicators from each of the endpoints. The second set may include an indication of a compliance state from the second and the third subsets that are active and an indication of a communicative state from the first subset that is inactive. The method may include generating a second device status array based on the second set. The second device status array may indicate the statuses of the endpoints at the second time. The method may include generating a final device status array. The generating may include populating the final device status array with the first device status array. The method may include deduplicating one or more of the statuses of the endpoint in the final device status array. After the assessment period, the method may include determining whether a second endpoint has a noncompliant state in the final device status array. Responsive to the second endpoint having the noncompliant state in the final device status array, the method may include mitigating the second endpoint. Mitigation of the second endpoint may include initiating an action at the second endpoint to change a state of the second endpoint and bring the second endpoint into compliance.

A further aspect of an embodiment may include non-transitory computer-readable medium having encoded therein programming code executable by one or more processors to perform or control performance of one or more of the operations of the methods described above.

An additional aspect of an embodiment may include compute device comprising one or more processors and a non-transitory computer-readable medium having encoded therein programming code executable by one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 depicts a diagram of an example arrays that may include information of the batch endpoint assessments of FIGS. 3A-3C;

DESCRIPTION OF SOME EXAMPLE EMBODIMENTS

Figure 1:
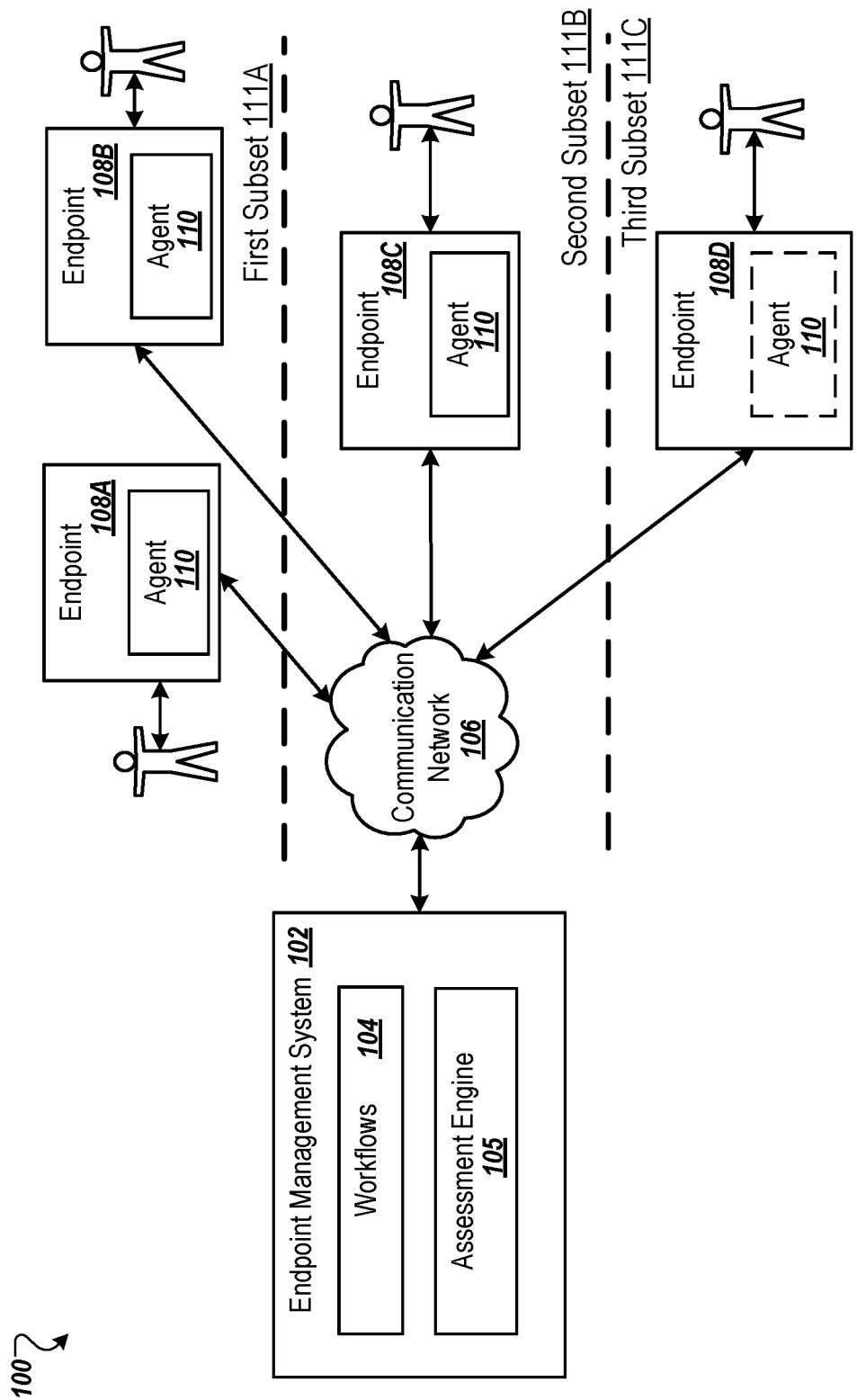
FIG. 1 illustrates an example network management system in which some embodiments may be implemented.

Electronic devices that access or otherwise interface with a network may be described as endpoints relative to the network. An endpoint management system may be employed to manage the endpoints of a particular network, which may be described as a managed network. The endpoint management system may monitor the endpoints, may ensure the endpoints comply with security requirements, may act to repair problems experienced by the endpoints, and the like. Thus, for example, the endpoint management system may promote efficiency, security, and functionality of the managed network at least in part through the management of the associated endpoints.

For instance, endpoints may provide malicious actors with an opportunity to access the managed network for nefarious reasons. The stakes associated with network security are high. For instance, malicious actors may attempt to obtain access to networks and connected systems in order to install ransomware, which may lock out owners and users from the network or connected systems until a ransom is paid. Alternately or additionally, malicious actors may leverage network access to steal confidential information, to wreak havoc on connected systems, to gain access to additional devices, and the like.

One way to mitigate the risk of malicious actors obtaining access to a network is to assess whether endpoints that access the network or intend to access the network are compliant with network requirements such as security requirements, settings (e.g., firewall settings, etc.) on the endpoints, particular software programs installed at the endpoints, particular versions of the software programs, and the like. Thus, a network owner or a network manager may periodically assess the endpoints that intend to or regularly access the network.

Conventionally, endpoint assessment may be performed on an endpoint-by-endpoint basis or a batch basis. Conventional endpoint assessments performed on an endpoint-by-endpoint basis may take a significant length of time to complete because each endpoint is assessed and mitigated independently. Endpoint-by-endpoint assessment is not practical in larger networks including hundreds or thousands of endpoints.

Batch assessments may be performed substantially simultaneously for a batch of endpoints, such as endpoints associated with a geographic area or endpoints associated with a managed network. However, conventional batch assessments may generate incomplete information regarding the endpoints as, at the time the batch assessment is performed, multiple endpoints may be offline or experiencing a transient issue that interferes with the ability of the endpoint to receive and/or respond to the batch assessment query. For example, an endpoint may be turned off, may not have active internet access, may be experiencing temporary connection issues, or the like. Furthermore, the particular endpoints that are unavailable may change over time. Thus, for example, a conventional endpoint assessment system that classifies endpoints as compliant in response to the endpoints reporting that the endpoints meet the criteria for compliance will classify the other endpoints as noncompliant. However, at least some of the endpoints classified as noncompliant may include endpoints that meet the criteria for compliance but experienced temporary connection issues at the time the batch assessment occurred.

Conventional endpoint assessment systems may periodically perform the endpoint assessment query in an attempt to receive a response from all of the endpoints. However, the assessment may not be completed correctly relative to all endpoints, as endpoints that were unreachable for the period of the query may be reported as noncompliant.

Embodiments described herein may derive relatively more accurate assessments of the endpoints. For example, an endpoint management system may perform what is described herein as a deduplication process to generate a deduplicated assessment. The deduplicated assessments may be performed as an action within a workflow or may be performed independently by an endpoint management system.

The deduplicated assessment process may include performing a series of assessments over a length of time (an assessment period) and combining the series of assessments into a single, deduplicated assessment. In some embodiments, the assessments may be staggered such that the assessments occur at different times of the day, at different portions of the week, and the like. For instance, a first assessment may be performed on a Monday, Tuesday, Wednesday, Thursday, or Friday during a time that falls within typical business hours for the time zones of North America. A second assessment may be performed on a Tuesday, Wednesday, or Thursday that falls within typical business hours for the time zones of Europe. A third assessment and a fourth assessment may be performed at still different times and/or different days. In some embodiments, the deduplicated assessment process may be performed at different times of the day over two days, which may reach endpoints that experience temporary connection issues or were not powered on for a day because an associated user had a day off or the like.

For each assessment performed, an assessment versions or arrays may be generated. Each assessment version may describe a status for each of the endpoints provided in response to the associated assessment. The above table shows four assessment versions, although more or fewer assessments may be performed. In some embodiments, endpoints may be associated with one of three statuses for each version. For instance, an endpoint may be associated with a compliant status in response to the endpoint responding to the assessment by indicating that the endpoint is compliant with the requirements for network access. Alternatively, an endpoint may be associated with a noncompliant status in response to the endpoint responding to the assessment by indicating that the endpoint is not compliant with the requirements for network access. Alternatively, an endpoint may be associated with an incomplete status in response to failing to receive a response to the assessment.

Assessment versions from a series of assessments may be filtered or otherwise processed to generate a deduplicated state of the endpoints. By way of example, a compliant status received as part of a more recent assessment may supersede prior noncompliant statuses. Additionally or alternatively if a given endpoint responds to a first three assessments with a noncompliant status and responds to a fourth assessment with a compliant status, the given endpoint may be assigned a compliant deduplicated state. Alternately or additionally, incomplete statuses may be ignored in favor of compliant or noncompliant statuses if available. If a given endpoint fails to return a status in some of the assessments but responds with a compliant or noncompliant status in other assessments, the endpoint may be assigned an associated compliant or noncompliant deduplicated state. Alternately or additionally, if a given endpoint fails to return a status in any of the assessments, the endpoint may be assigned an unknown deduplicated state.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 illustrates an example network management system 100. The network management system 100 may include an endpoint management system 102 that may communicate with endpoints 108A-108D, (generally, endpoint 108 or endpoints 108) via a communication network 106. Although four of the endpoints 108 are illustrated, more than three endpoints 108 may be present in a practical network management system 100.

The endpoints 108 may be associated with a network managed by the network management system 100. For example, the managed network may include a network owned by a business and the endpoints 108 may include business-owned computers for employees to perform employment-related duties; personal computing devices such as mobile phones, tablets, computers not controlled by the business that may be used by employees, customers, vendors, and the like to access the network managed by the network management system 100; connected devices such as servers, printers, network infrastructure, and the like; or other devices that may interface with the managed network.

The communication network 106 may include the network managed by the network management system 100. For example, the communication network 106 may include the managed network and the internet. Alternately, the communication network 106 may be separate from the managed network. For example, the communication network 106 may include the internet and the managed network may restrict access by one or more of the endpoints 108 until compliant with the conditions imposed by the endpoint management system 102. Alternately, the communication network 106 may represent the managed network.

The network management system 100 may take actions to keep the associated managed network functional and safe from the actions of malicious actors. One tool used by the network management system 100 may include the endpoint management system 102. The endpoint management system 102 may identify and catalog the endpoints 108 that interface with the managed network. The endpoint management system 102 may identify the endpoints 108 to which emails, documents, and other information are transferred via the managed network.

In some configurations, agents 110 may be installed on one or more of the endpoints 108. The agents 110 may provide the endpoint management system 102 with more information about the associated endpoints 108 relative to endpoints 108 that do not include the agents 110. The information collected about the endpoints 108, optionally via agents 110, may be used to manage other endpoints 108. For example, if the endpoint management system 102 identifies an issue with one of the endpoints 108 that is a risk to the managed network, the endpoint management system 102 may use knowledge regarding the endpoints 108 to identify those endpoints 108 that may pose a similar risk. By way of example, if installed software or a particular setting of the endpoint 108A results in an issue with the endpoint 108A, a fix may be created for the issue, applied to the endpoint 108A and further applied to any of the endpoints 108 that include the same software or particular setting.

The endpoints 108 may be separated into subsets 111A-111C (generally, subset 111 or subsets 111). The subsets 111 may include one of more of the endpoints 108 that are subject to different conditions. The different conditions may include any circumstance or configuration that effects whether the endpoints 108 are active or inactive during an assessment. Some examples of the conditions may include environmental conditions such as geographical conditions, network connectivity, working hours of users associated with the endpoints 108, and the like. Additional examples of the conditions may include configuration conditions such as the endpoint 108 being in a standby state (e.g., airplane mode or a reduced power state), the endpoint 108 having a security feature that prevents communication, malfunction of the agent 110, and the like. The conditions may change over time. For instance, the endpoints 108 in a first subset 111A may be inactive during a first time and then later (e.g., when the workday starts) may become active. Similarly, the endpoints 108 in a second subset 111B may change from a standby state to an operational state.

In some configurations, the endpoint management system 102 may determine whether the endpoints 108 have particular software installed and whether the software is sufficiently up to date. Similarly, the endpoint management system 102 may monitor settings of the endpoints 108, such as firewall setting, antivirus protection settings, and the like. Endpoints 108 that do not include the required software, include the required software without required updates, and/or have undesirable settings may be denied access to the managed network or given limited access to the managed network.

In some embodiments, the endpoint management system 102 may direct the endpoints 108, optionally through the agents 110, to change settings, install software or software updates such as patches, and the like. Thus, for example, the endpoints 108 may be prompted to reach a compliant state for accessing the managed network. Compliant endpoints 108 may also make the information stored locally on the endpoints 108 more secure, which may protect endpoint-stored business data of the owner of the managed network.

In some instances, to determine whether the endpoints 108 are properly configured, comply with security requirements, and the like, the endpoint management system 102 may include an assessment engine 105 that is configured to perform assessments of the endpoints 108.

In some embodiments, the endpoint management system 102 may perform endpoint management tasks through workflows 104. The workflows 104 may define series of steps the endpoint management system 102 may take to manage the endpoints 108. The workflows 104 may be conditional and may proceed with different steps in response to different scenarios. In some configurations, the workflows 104 may include generating assessments performed by the assessment engine 105.

As described elsewhere in the present disclosure, the assessments performed by the assessment engine 105 may be deduplicated. For instance, the assessment engine 105 may be configured to perform security compliance evaluation and remediation for the endpoints 108 in the subsets 111. The assessment engine 105 may be configured to perform multiple batch endpoint assessments. The batch endpoint assessments include receiving status or assessment indicators associated with at least one of the subsets 111 of endpoints 108. For one or more or each of the batch endpoint assessment, the assessment engine 105 may assign a status to the endpoints 108 based on the plurality of status or assessment indicators. The assessment engine 105 may generate a state of the endpoints 108 of the based on the statuses assigned thereto and mitigate or initiate mitigation of any noncompliant endpoints 108.

Additionally or alternatively, the assessment engine 105 may be configured to perform endpoint compliance evaluation and remediation. The assessment engine 105 may perform a first batch endpoint assessment at a first time during which the first subset 111A and a third subset 111C of the endpoints 108 are active and a second subset 111B of the endpoints 108 is inactive. Responsive to the first batch endpoint assessment, the assessment engine 105 may receive a first set of assessment indicators from the endpoints 108. The first set may include an indication of a compliance state from the first subset 111A and the third subset 111C that are active and an indication of a communicative state from the second subset 111B that is inactive. The assessment engine 105 may generate a first device status array based on the first set. The first device status array indicates the statuses of the endpoints 108 at the first time.

The assessment engine 105 may perform a second batch endpoint assessment at a second time. The second time may be during an assessment period and following the first time. The second subset 111B and the third subset 111C are active at the second time and the first subset 111A is inactive at the second time.

Responsive to the second batch endpoint assessment, the assessment engine 105 may receive a second set of assessment indicators from the endpoints 108. The second set includes an indication of a compliance state from the second and the third subsets 111B and 111C that are active and an indication of a communicative state from the first subset 111A that is inactive.

The assessment engine 105 may generate a second device status array based on the second set. The second device status array indicates the statuses of the endpoints 108 at the second time. The assessment engine 105 may then generate a final device status array by deduplicating the arrays. By way of example, a compliant status received as part of a more recent assessment may supersede prior noncompliant statuses. Additionally or alternatively if a given endpoint 108 responds to a first three assessments with a noncompliant status and responds to a fourth assessment with a compliant status, the given endpoint 108 may be assigned a compliant deduplicated state. Alternately or additionally, incomplete statuses may be ignored in favor of compliant or noncompliant statuses if available. If a given endpoint 108 fails to return a status in some of the assessments but responds with a compliant or noncompliant status in other assessments, the endpoint 108 may be assigned an associated compliant or noncompliant deduplicated state. Alternately or additionally, if a given endpoint 108 fails to return a status in any of the assessments, the endpoint 108 may be assigned an unknown deduplicated state. After the assessment period, the assessment engine 105 may determine whether one or more of the endpoints 108 has a noncompliant state. Responsive to the endpoint(s) 108 having the noncompliant state in the final device status array, the assessment engine 105 may mitigate or initiate the mitigation those endpoints 108 by initiating an action at each of the noncompliant endpoints 108 to change a state of the endpoint 108 and bring the endpoint 108 into compliance.

In some embodiments, the endpoint management system 102 may implement one or more of the functionalities described above using the assessment engine 105. The assessment engine 105, the agent 110, and components thereof may be implemented using hardware including a processor, a microprocessor (e.g., to perform or control performance of one or more operations), a field-programmable gate array (FPGA), or an application-specific integrated circuit (ASIC). In some other instances, the assessment engine 105, the agent 110, and components thereof may be implemented using a combination of hardware and software. Implementation in software may include rapid activation and deactivation of one or more transistors or transistor elements such as may be included in hardware of a computing system (e.g., the endpoints 108 or the endpoint management system 102 of FIG. 1). Additionally, software defined instructions may operate on information within transistor elements. Implementation of software instructions may at least temporarily reconfigure electronic pathways and transform computing hardware.

Modifications, additions, or omissions may be made to the network management system 100 without departing from the scope of the present disclosure. For example, the network management system 100 may include one or more communication networks 106, one or more endpoint management systems 102, one or more endpoints 108, or any combination thereof. Additionally, the network management system 100 may include multiple networks of the endpoints 108. For instance, the network management system 100 might include a first network of endpoints 108 that are related to a first enterprise or entity and a second network of endpoints 108 that are related to a second enterprise or entity. The endpoint management system 102 may receive reports or notifications from the first network and perform actions in the second network.

Moreover, the separation of various components and devices in the embodiments described herein is not meant to indicate that the separation occurs in all embodiments. Moreover, it may be understood with the benefit of this disclosure that the described components and servers may be integrated together in a single component or server or separated into multiple components or servers.

Figure 2:
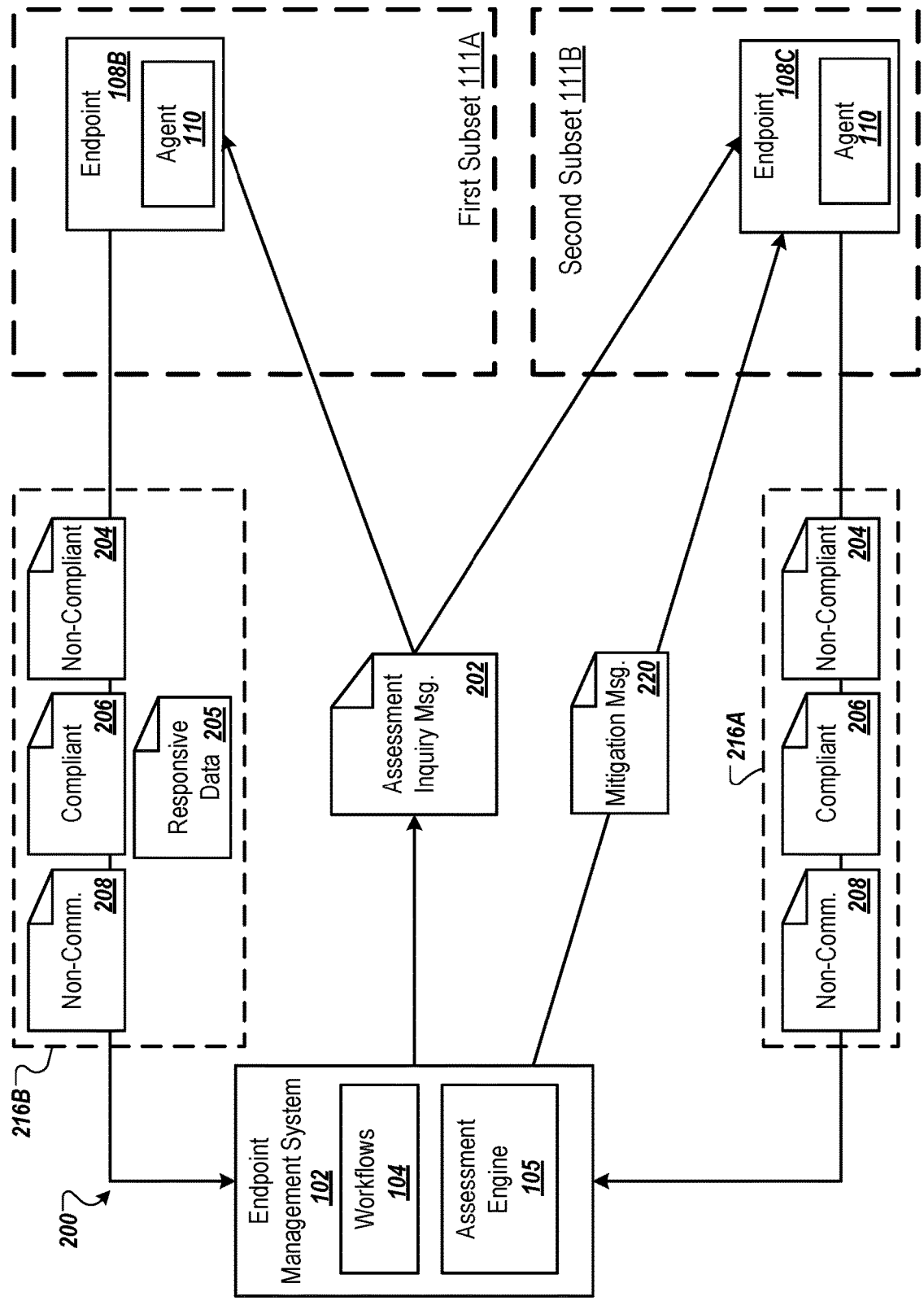
FIG. 2 illustrates an example endpoint assessment process that may be implemented in the network management system of FIG. 1.

FIG. 2 illustrates an example endpoint assessment process (assessment process) 200 that may be implemented in the network management system 100 of FIG. 1 or another suitable environment. The assessment process 200 may include some of the components (e.g., 102, 108, and 110) of FIG. 1. The communication network 106 is omitted from FIG. 2, however communications between the components of FIG. 2 may be via the communication network 106 or another suitable communication network.

In FIG. 2, the assessment process 200 includes communication of an assessment inquiry message 202 to the endpoints 108. The inquiry message 202 may be communicated to the agent 110 or to another component that may be configured to receive the message 202. The assessment message 202 may be configured to request assessment of or to assess a status or a condition of the endpoint 108. Some examples of the status or the condition may include whether a particular software is installed, communication status, security settings, use, location, versions of software, particular hardware settings, firewall status, other states or conditions or combinations thereof.

The inquiry message 202 may be communicated to both endpoints in both of the subsets 111. At a time in which the message 202 is sent, the first subset 111A may be active while the second subset 111B may be inactive, both subsets 111 may be active, or both subsets may be inactive. The endpoints 108 that are inactive may not respond to the inquiry message 202 or may otherwise be unable to receive or process the inquiry message 202.

In response to the message 202, assessment indicators 216A and 216B (generally, assessment indicators 216) may be received by the assessment engine 105. The assessment indicators 216 may indicate the status or condition sought in the inquiry message 202, may include responsive data 205, may indicate the active/inactive status of the endpoints 108, or some combination thereof.

For example, in FIG. 2, the assessment indicators 216 might include a compliant indicator 206, a noncompliant indicator 204, or a non-communication indicator 208. The compliant indicator 206 represents to the assessment engine 105 that the endpoint 108 receiving the message meets or includes the status or condition of the inquiry message 202. The noncompliant indicator 204 represents to the assessment engine 105 that the endpoint receiving message fails to meet or does not include the status or condition of the inquiry message 202. The non-communication indicator 208 represents to the assessment engine 105 that the endpoint 108 is inactive.

Additionally or alternatively, the assessment indicators 216 may include the responsive data 205. The responsive data may include data representative of a value or a state related to the inquiry message 202. The responsive data may be processed by the assessment engine 105 to determine compliance or communication status of the endpoints 108. For instance, in some embodiments the inquiry message 202 may assess whether a first version of a software is installed at the endpoint 108. A compliant indicator 206 may represent to the assessment engine 105 that the first version is installed at the endpoint 108. For instance, the agent 110 may assess the files at the endpoint 108, make the determination as to whether the first version is installed, and communicate the compliant indicator 206. Additionally or alternatively, the agent 110 may communicate the responsive data 205 representative of a particular version of the software at the endpoint 108 (e.g., "first version"). The endpoint management system 102 or the assessment engine 105 may then determine compliance based on the responsive data 205.

FIG. 2 depicts a single inquiry message 202. However, the assessment engine 105 may be configured to communicate the inquiry message 202 two or more times during an assessment period. The multiple inquiry messages may enable the assessment engine 105 to obtain information from the subsets 111 despite inactivity of some portion of the endpoints 108 during the assessment period. The assessment period may last any suitable time configured to communicate with each or most of the endpoints 108 while they are active.

For example, the first subset 111A might include the endpoints at a first geographic region (e.g., Europe) while the second subset 111B might include the endpoints at a second geographic region (e.g., the United States). The assessment period may accordingly last at least ten hours to ensure it covers working days of both geographic regions. In other circumstances, the assessment period may include multiple days (e.g., two, three, or four days) to last over a weekend or a common travel period.

Additionally or alternatively, the assessment period may continue until the compliance status of each of the endpoints 108 is determined. For instance, the assessment period may be set for ten hours, but all of the endpoints 108 may be evaluated in the first four hours. In these and other embodiments, after all the endpoints 108 are evaluated the assessment period may stop.

During the assessment period, the assessment engine 105 may de-duplicate the assessment indications 216. De-duplication processes the assessment indicators 216 from the two or more inquiry messages 202. In general, the de-duplication substitutes some of the assessment indicators 216 from later assessment processes 200 for those received from earlier assessment processes 200.

Figure 3A:
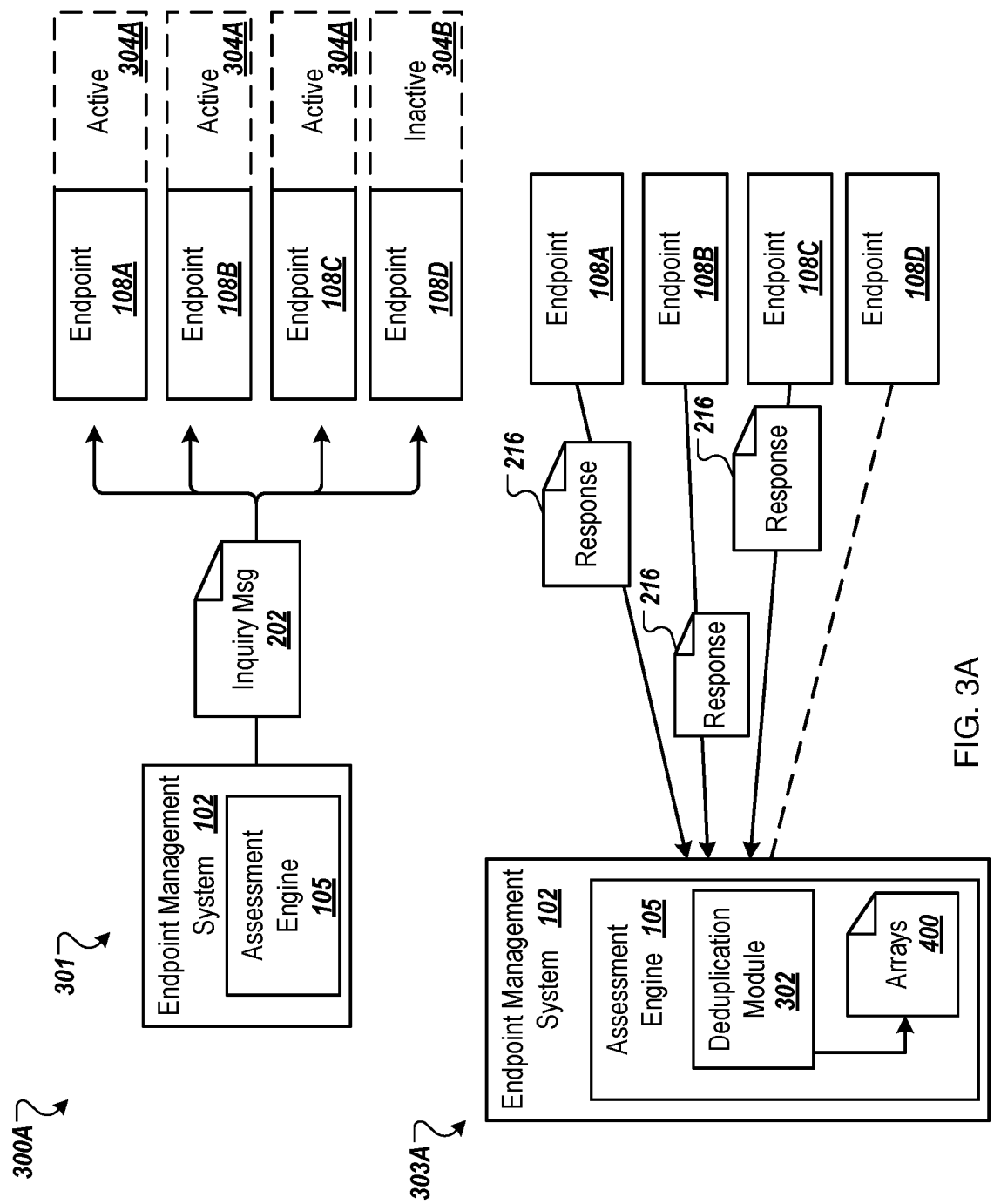
FIGS. 3A-3C depict an example series of batch endpoint assessments that may occur during the endpoint assessment process of FIG. 2.
Figure 3B:
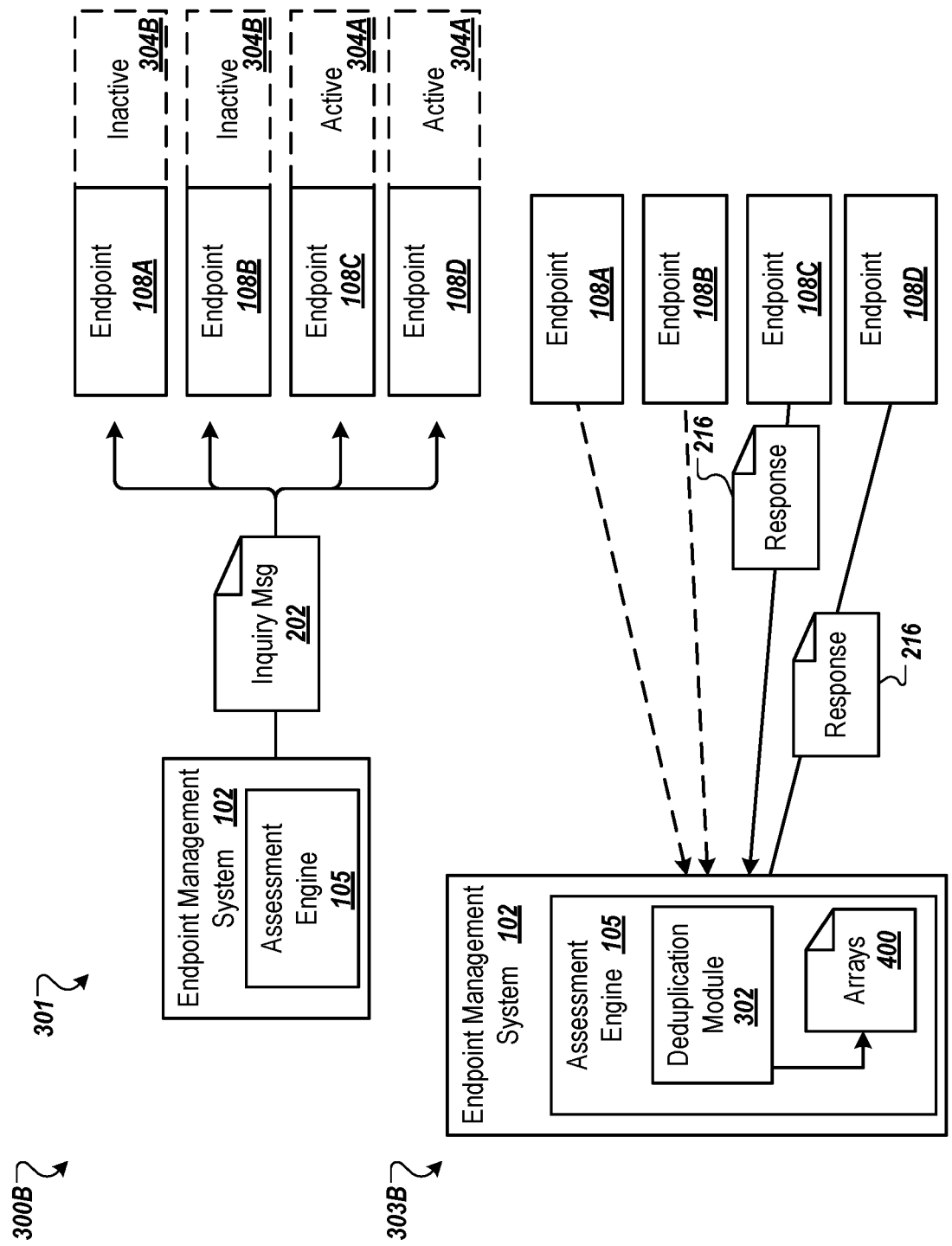
Figure 3C:
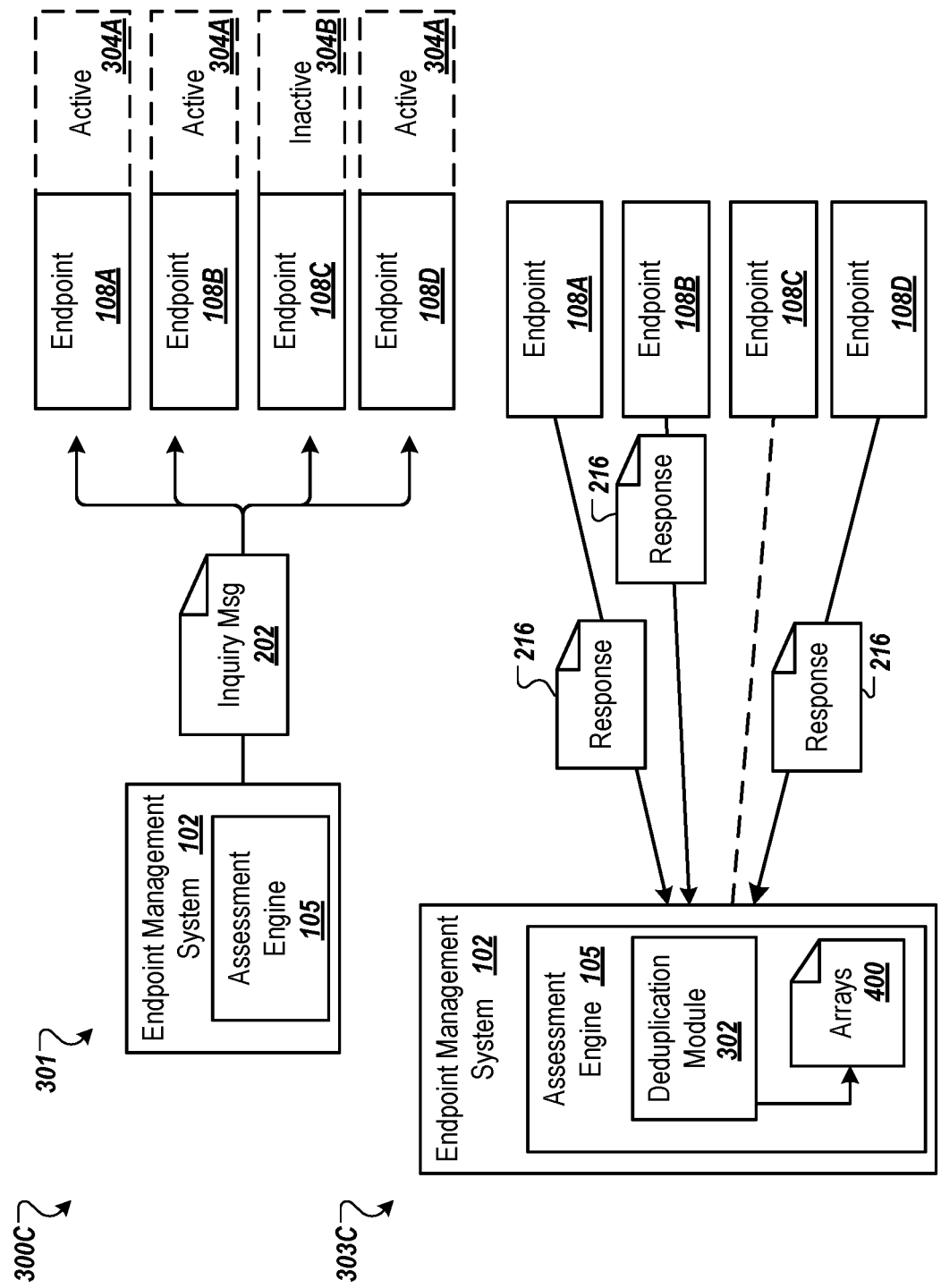

For instance, with reference to FIGS. 3A-3C, an example series of batch endpoint assessments 300A-300C that may occur during an assessment period are depicted. In the batch endpoint assessments 300, an inquiry operation 301 may occur. The inquiry operation 301 may occur in each of the batch endpoint assessments. Following the inquiry operation 301, the batch endpoint assessments 300A-300C include a receipt operation 303A, 303B, and 303C.

In the inquiry operation 301, the endpoint management system 102 communicates the inquiry message 202 to endpoints 108A-108D. As discussed above, the inquiry message 202 requests information related to a state or condition at the endpoints 108. The inquiry message 202 is communicated to each of the endpoints 108 in the shown embodiments. In other embodiments, the inquiry message 202 may communicate the inquiry message 202 to a subset of the endpoints 108 such as those with an unknown status.

In the inquiry operation 301 of FIGS. 3A-3C, each of the endpoints 108 include a communication status 304A or 304B. The communication status 304A or 304B represents whether one of the endpoints 108 is in a state relative to the endpoint management system 102 that enables receipt of and response to the inquiry message 202. The two communication statuses 304A or 304B in FIGS. 3A-3C are "active" or "inactive." Active indicates that the endpoint 108 is in communication with the endpoint management system 102 and/or able to process the inquiry message 202 to determine whether the endpoint 108 is compliant and/or retrieve data that is responsive to the inquiry message 202.

Inactive indicates that the endpoint 108 is not in communication with the endpoint management system 102 or not in a state that enables response to the inquiry message 202. Some reasons the endpoint 108 might be inactive may include the endpoint 108 being turned off, the endpoint 108 being in a reduced-power or standby state, the user not being logged into the endpoint 108, the endpoint 108 being in an "airplane mode," the endpoint 108 being communicatively isolated from the endpoint management system 102, the endpoint 108 being geographically isolated, the endpoint 108 malfunctioning, and the like.

The receipt operations 303A, 303B, and 303C depict communication of assessment indications 216 from the endpoints 108. The assessment indications 216 may be substantially similar to and correspond to the assessment indications 216 described with reference to FIG. 2. The assessment indications 216 may be communicated in response to the endpoints 108 receiving and/or processing the inquiry message 202.

Failure to respond with the assessment indication 216 may result in the assessment engine 105 determining that the compliant state (e.g., being compliant or noncompliant) of the endpoint 108 being unknown. Additionally, responsive to an assessment indication 216 with abnormal or nonconforming data, the assessment engine 105 may interpret the endpoint 108 to be in an unknown state.

Some of the endpoints 108 may not communicate an assessment indication 216. For instance, in FIG. 3A, the fourth endpoint 108D may not communicate the assessment indication 216. The fourth endpoint 108D may not communicate the assessment indication 216 because it in an inactive state (e.g., 304B). In response to the lack of assessment indication 216, the assessment engine 105 may determine that a status of the endpoint 108 is unknown.

Some of the endpoints 108 (e.g., the endpoints 108A-108C) communicate the assessment indications 216 to the assessment engine 105. The endpoints 108 that communicate the assessment indications 216 are active (e.g., 304A). The assessment indications 216 include information that indicates whether the endpoints 108 are compliant or non-compliant. As described elsewhere in the present disclosure the information may expressly indicate whether the endpoint 108 is compliant or not. Additionally or alternatively, the assessment indications 216 may include responsive data (e.g., that might be processed by the assessment engine 105. The assessment indications 216 and/or lack of assessment indications 216 responsive to a particular inquiry message 202 may be referred to as a set in the present disclosure.

The assessment engine 105 or another module of the endpoint management system 102 may generate one or more arrays 400. In some embodiments, the assessment engine 105 may generate one of the arrays 400 for each of the batch endpoint assessments 300A-300C. The arrays 400 may be based on the sets of assessment indications 216. For instance, the arrays 400 may include a first array that is based on a first batch assessment 300A and a set of assessment indications 216 that result therefrom as well as a second array that is based on a second batch endpoint assessment 300B of FIG. 3B and a set of the assessment indications 216 that result therefrom.

Information and data in the arrays 400 are deduplicated. The deduplication includes changes to the assessment indications 216 over time and/or during the assessment period. For instance, a second array based on a second batch assessment may be used to deduplicate a first array based on an earlier batch assessment. These changes reflect updated states of the endpoints 108 during the assessment period. The deduplication allows for the assessment to include multiple batch assessments that take place during the assessment period instead of a discrete or individual assessment and instead of multiple batch assessment that result in multiple status arrays with conflicting and/or inconsistent data. The longer assessment period when compared to conventional assessment operations enables the capture of information from the endpoints in various environments and statuses (e.g., active or inactive). The deduplication additionally enables an improved focus of the mitigation efforts, which are described more elsewhere in the present disclosure.

FIG. 4 depicts a diagram of an example of the arrays 400 that may include information of the assessment indications 216 of FIGS. 3A-3C. The arrays 400 of FIG. 4 include a first array 401A that corresponds to the first batch assessment 300A, a second array 401B that corresponds to a second batch assessment 300B, a third array 401C that corresponds to a third batch assessment 300C, and a final array 408. Although the arrays 400 of FIG. 4 include four arrays 401A-401C and 408, some embodiments might include more than four arrays 401A-401C and 408. Additionally, the arrays 400 include statuses of four endpoints 108A-108D that correspond to the endpoints in FIGS. 3A-3C. In some embodiments, the number endpoints 108 may include more than four endpoints 108. For instance, some embodiments may include hundreds or thousands of endpoints 108.

Referring to FIGS. 3A and 4, the first array 401A corresponds to the first batch assessment 300A. The assessment indications 216 are received by the assessment engine 105 and incorporated by a deduplication module 302 into the arrays 400. For instance, in this example, the assessment indications 216 are received from the endpoints 108A-108C and not received from the endpoint 108D. In the first array 401A the assessment indications 216 indicate that the endpoints 108A-108C are noncompliant (e.g., 208 of FIG. 2). Additionally, the lack of the assessment indication 216 from the endpoint 108D results in an unknown status (e.g., 206 of FIG. 2) in the first array 401A. The unknown status may be because the endpoint 108D is inactive at the time of the first batch assessment 300A.

Referring to FIGS. 3B and 4, the second array 401B corresponds to the second batch assessment 300B. The assessment indications 216 are received by the assessment engine 105 and incorporated by the deduplication module 302 into the arrays 400. For instance, in this example, the assessment indications 216 are received from the endpoints 108C-108D and not received from the endpoints 108A and 108B. In the second array 401B the assessment indications 216 indicate that the endpoints 108C and 108D are compliant (e.g., 204 of FIG. 2). Additionally, the lack of the assessment indication 216 from the endpoints 108A and 108B results in an unknown status (e.g., 206 of FIG. 2) in the second array 401B. Again, the unknown status may be because the endpoints 108A and 108B are inactive at the time of the second batch assessment 300B.

Referring to FIGS. 3C and 4, the third array 401C corresponds to the third batch assessment 300C. The assessment indications 216 are received by the assessment engine 105 and incorporated by the deduplication module 302 into the arrays 400. For instance, in this example, the assessment indications 216 are received from the endpoints 108A-108B and 108D and not received from the endpoint 108C. In the third array 401C the assessment indications 216 indicate that the endpoints 108A is noncompliant, the endpoints 108B and 108D are compliant (e.g., 204 of FIG. 2). Additionally, the lack of the assessment indication 216 from the endpoint 108C results in an unknown status (e.g., 206 of FIG. 2) in the third array 401C. Again, the unknown status may be because the endpoint 108C is inactive at the time of the third batch assessment 300C.

The final array 408 represents a deduplication of the first-third arrays 401A-401C. The deduplication may be performed by the deduplication module 302 of FIGS. 300A-300C. The deduplication operation includes comparing two or more of the arrays 401A-401C to identify one or more compliance state differences. The compliance state differences of the endpoints 108 include a change is status between arrays 401A-401C from subsequent or directly subsequent batch assessments. The deduplication module 302 makes modifications based on a previous status and an updated status. For instance, for the first endpoint 108A of FIG. 4, between the first array 401A and the second array 401B, the status changed from "noncompliant" to "unknown." The deduplication module 302 may accordingly change or not change the status based on identification of the compliance state difference. The change made or not made is based on the compliance state difference.

in some embodiments, responsive to the identified compliance state difference including a change from a noncompliant state or a non-communicative (e.g., unknown) state to a compliant state, the deduplication module 302 may update a status of the particular endpoint 108 to the compliant state in the final array 408. Responsive to the identified compliance state difference of the particular endpoint 108 including a change from a compliant state to a noncompliant state or to a non-communicative (unknown) state, the deduplication module 302 may not update the status of the particular endpoint 108 in the final array 408. Responsive to the identified compliance state difference of the particular endpoint 108 including a change from a noncompliant state to a non-communicative state or from non-communicative state to a noncompliant state, the deduplication module 302 may update the status of the particular endpoint 108 to the state at the second time in the final array 408. The final array 408 in FIG. 4 represents a deduplication of the arrays 401A-401C according to some embodiments of the deduplication module 302. The final array 408 may be used to determine whether one or more of the endpoints 108 has a noncompliant state following the assessment period. Noncompliance of one or more of the endpoints 108 may be mitigated. Mitigation may include initiating an action at the second endpoint to change a state of the second endpoint and bring the second endpoint into compliance. In some embodiments, the mitigating includes communicating a patch for installation, modifying a setting at the second endpoint, deleting a file or program on the second endpoint, installing a file or program on the second endpoint, another mitigation action, or combinations thereof.

Referring back to FIG. 2, following the assessment period, the assessment engine 105 may be configured to review a final device status array such as the final array 408 of FIG. 4. Based on the review, the assessment engine 105 may determine whether one or more of the endpoint 108 are in a noncompliant state.

In response to none of the endpoints 108 having a noncompliant state, the assessment engine 105 may report information in the final device status array to an administrator or the endpoint management system 102. The report may be used throughout the environment such as overall network compliance, a security level agreement (SLA), etc.

In response to one or more of the endpoints 108 having a noncompliant state, the endpoint management system 102 may mitigate the noncompliant state of the endpoint 108. Mitigation may include initiating an action at the endpoint 108 to change a state or configuration of the endpoint 108 and bring the endpoint 108 into compliance. In some embodiments, the mitigation may include communication of a mitigation message 220 to one or more of the endpoints 108. The mitigation message 220 may include a command to modify a setting or configuration of the endpoint 108, may include a patch that is installed at the endpoint 108, modifying a setting at the second endpoint, deleting a file or program on the second endpoint, installing a file or program on the second endpoint, another mitigation action, or combinations thereof.

Figure 5:
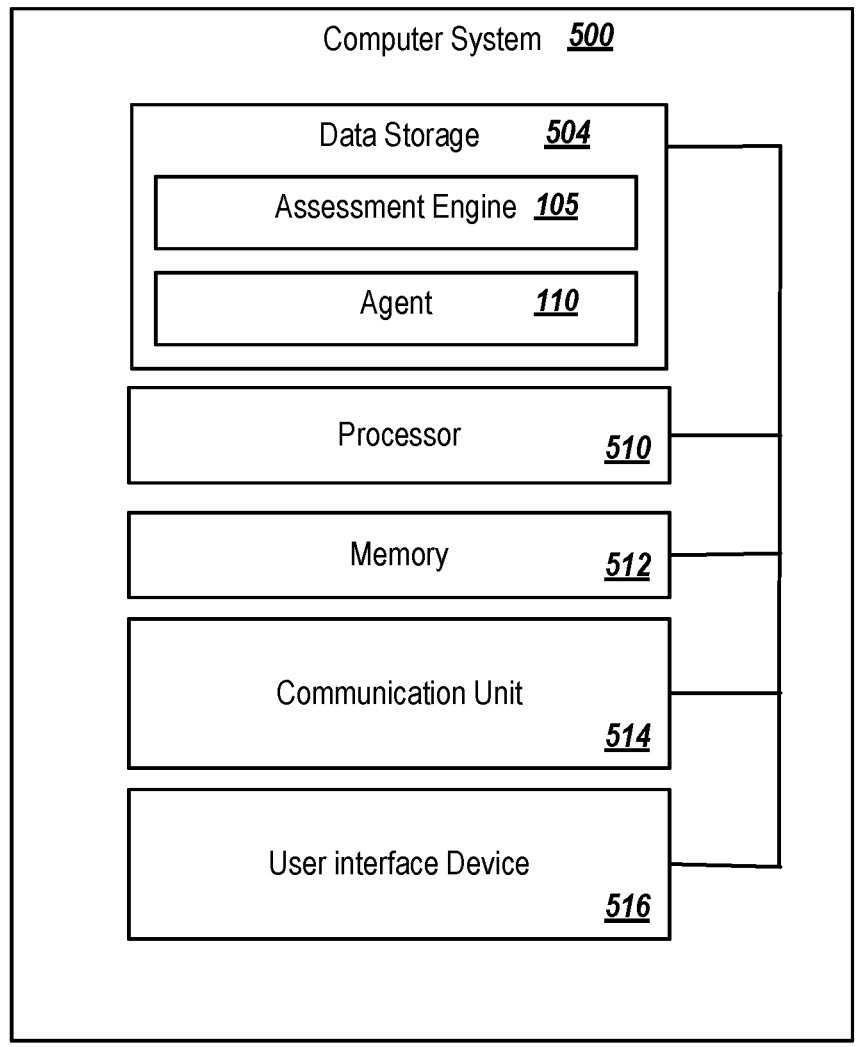
FIG. 5 illustrates an example computer system configured for endpoint compliance evaluation and remediation for a network of endpoints.

FIG. 5 illustrates an example computer system 500 configured for endpoint compliance evaluation and remediation for a network of endpoints, according to at least one embodiment of the present disclosure. The computer system 500 may be implemented in the network management system 100 FIG. 1, for instance. Examples of the computer system 500 may include one or both of the endpoint management system 102 and one or more of the endpoints 108. The computer system 500 may include one or more processors 510, a memory 512, a communication unit 514, a user interface device 516, and a data storage 504 that includes the assessment engine 105 configured for network event detection and automated remediation.

The processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 5, the processor 510 may more generally include any number of processors configured to perform individually or collectively any number of operations described in the present disclosure. Additionally, one or more of the processors 510 may be present on one or more different electronic devices or computing systems. In some embodiments, the processor 510 may interpret and/or execute program instructions and/or process data stored in the memory 512, the data storage 504, or the memory 512 and the data storage 504. In some embodiments, the processor 510 may fetch program instructions from the data storage 504 and load the program instructions in the memory 512. After the program instructions are loaded into the memory 512, the processor 510 may execute the program instructions.

The memory 512 and the data storage 504 may include computer-readable storage media for carrying or having computer-executable instructions or data structures stored thereon. Such computer-readable storage media may include any available media that may be accessed by a general-purpose or special-purpose computer, such as the processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 514 may include one or more pieces of hardware configured to receive and send communications. In some embodiments, the communication unit 514 may include one or more of an antenna, a wired port, and modulation/demodulation hardware, among other communication hardware devices. In particular, the communication unit 514 may be configured to receive a communication from outside the computer system 500 and to present the communication to the processor 510 or to send a communication from the processor 510 to another device or network (e.g., 106 of FIG. 1).

The user interface device 516 may include one or more pieces of hardware configured to receive input from and/or provide output to a user. In some embodiments, the user interface device 516 may include one or more of a speaker, a microphone, a display, a keyboard, a touch screen, or a holographic projection, among other hardware devices.

The assessment engine 105 may include program instructions stored in the data storage 504. The processor 510 may be configured to load the assessment engine 105 into the memory 512 and execute the assessment engine 105. Alternatively, the processor 510 may execute the assessment engine 105 line-by-line from the data storage 504 without loading them into the memory 512. When executing the assessment engine 105, the processor 510 may be configured to perform one or more processes or operations described elsewhere in this disclosure.

Modifications, additions, or omissions may be made to the computer system 500 without departing from the scope of the present disclosure. For example, in some embodiments, the computer system 500 may not include the user interface device 516. In some embodiments, the different components of the computer system 500 may be physically separate and may be communicatively coupled via any suitable mechanism. For example, the data storage 504 may be part of a storage device that is separate from a device, which includes the processor 510, the memory 512, and the communication unit 514, that is communicatively coupled to the storage device. The embodiments described herein may include the use of a special-purpose or general-purpose computer including various computer hardware or software modules, as discussed in greater detail below.

Figure 6:
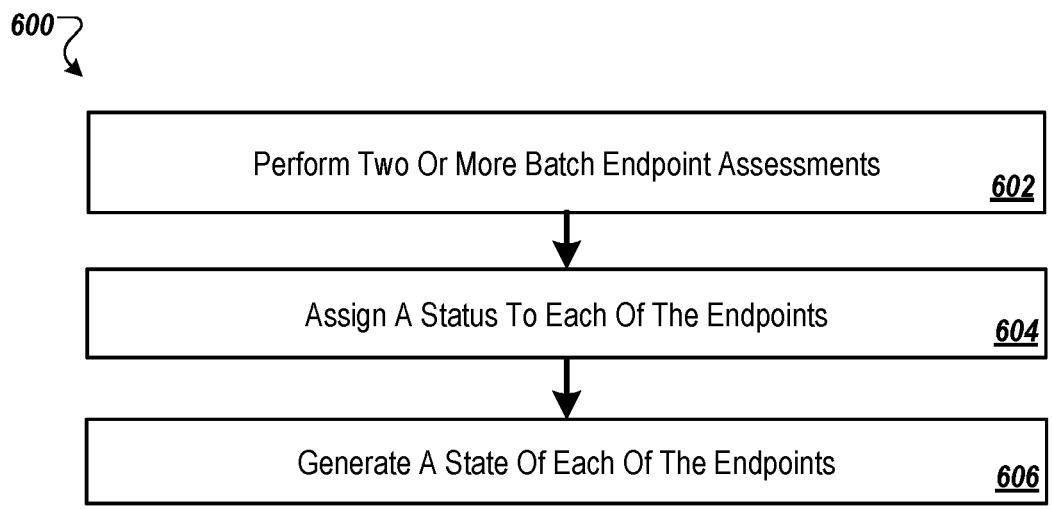
FIG. 6 is a flowchart for an example method of facilitating security compliance for endpoints associated with a network.

FIG. 6 is a flowchart for an example method 600 of facilitating security compliance for endpoints associated with a network. The endpoints may generally correspond to the endpoints 108 of FIG. 1. The network may generally correspond to the managed network described elsewhere in the present disclosure.

The method 600 may begin at block 602 by performing a plurality of batch endpoint assessments. Each of the batch endpoint assessments may include receiving a plurality of status indicators associated with at least a subset of the endpoints. In some embodiments, the subset of endpoints may include the endpoints for which an associated endpoint assessment was successful.

The method 600 may continue at block 604 by assigning a status to each of the endpoints. The assigned status may be based on the plurality of status indicators. In some embodiments, the status may include a compliant status or a noncompliant status for the subset of endpoints for which the associated endpoint assessment was successful. Alternately or additionally, the status may include an intermediate status for endpoints for which the associated endpoint assessment was unsuccessful.

The method 600 may continue at block 606 by generating a state of each of the endpoints. The generated state may be based on the statuses assigned to the endpoints. In some embodiments, generating the states may include generating a compliant state for the endpoints having at least one associated compliant status. Alternately or additionally, generating the states may include generating a noncompliant state for the endpoints having at least one associated noncompliant status and no associated compliant status. Alternately or additionally, generating the states may include generating an unknown state for the endpoints that have no associated compliant status and no associated noncompliant status.

For this and other processes and methods disclosed herein, the functions performed in the processes and methods may be implemented in differing order. Furthermore, the outlined operations are provided only as examples, and some of the operations may be optional, combined into fewer operations, or expanded into additional operations without detracting from the essence of the embodiments.

Figure 7:
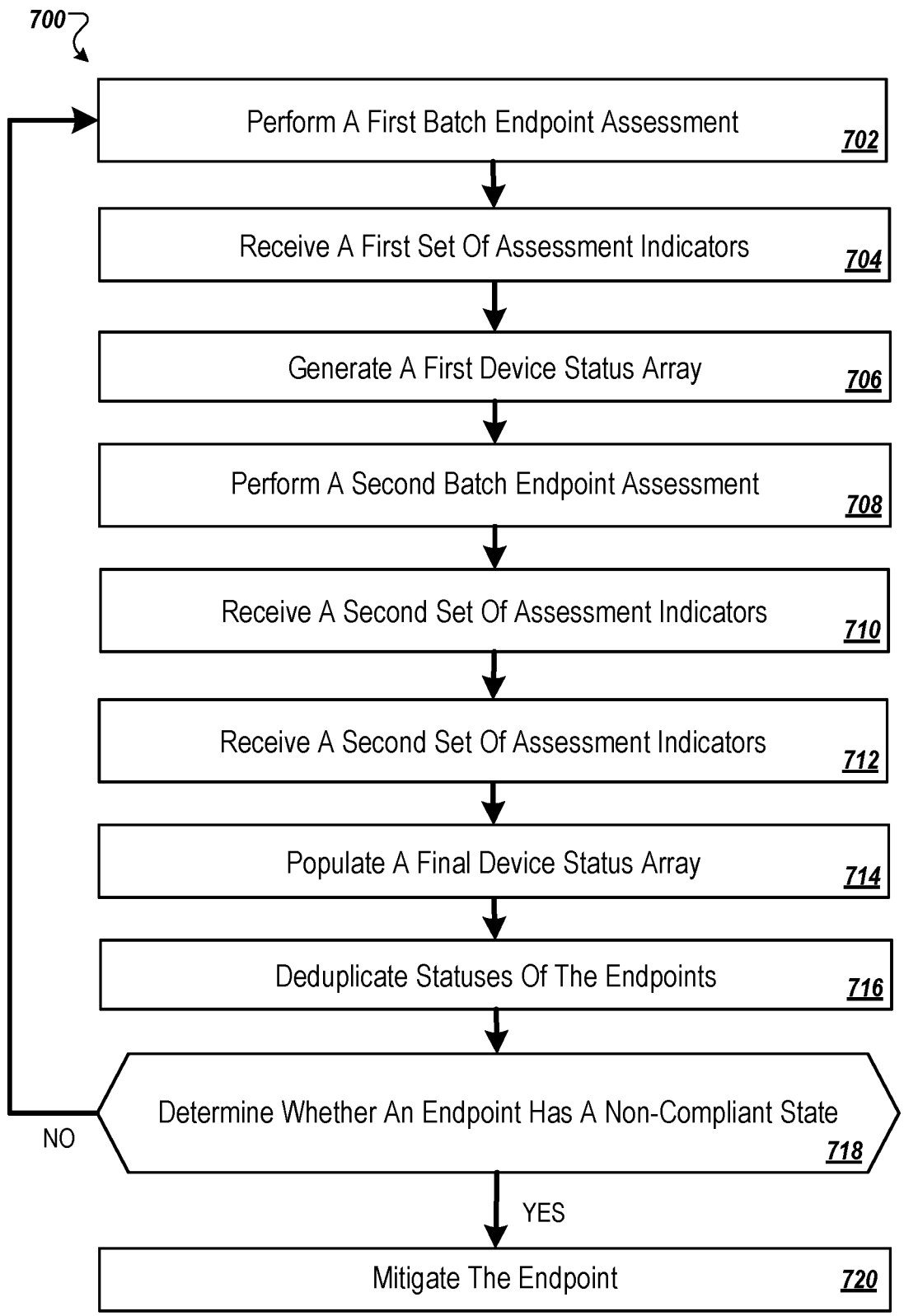
FIG. 7 is a flow diagram of an example method of endpoint compliance evaluation and remediation, all according to at least one embodiment described in the present disclosure.

FIG. 7 is a flow diagram of an example method 700 of endpoint compliance evaluation and remediation according to at least one embodiment of the present disclosure. The method 700 may be implemented for a network of endpoints having changing network communication states.

The method 700 may begin at block 702 in which a first batch endpoint assessment may be performed. The first batch endpoint assessment may be performed at a first time during which a first subset and a third subset of the endpoints are active, and a second subset of the endpoints is inactive. At block 704, a first set of assessment indicators may be received. The first set may be received responsive to the first batch endpoint assessment. The first set may be received from one or more or each of the endpoints in the network. The first set may include an indication of a compliance state from the first subset and the third subset that are active and an indication of a communicative state from the second subset that is inactive.

At block 706, a first device status array may be generated. The first device status array may be generated based on the first set. The first device status array may indicate the statuses of the endpoints at the first time. At block 708, a second batch endpoint assessment may be performed. The second batch endpoint assessment may be performed at a second time. At the second time, the second subset and the third subset may be active, and the first subset may be inactive at the second time.

The second time may be during an assessment period and following the first time. The assessment period may be determined such that most of all of the endpoints are active at least during a portion of the assessment period. For instance, in some embodiments, the first subset includes endpoints that interface with the network in a first geographic location and the second subset includes endpoints that interface with the network in a second geographic location that is geographically distinct from the first geographic location. Accordingly, the assessment period may several hours (e.g., 10, 12, 14, or 16 hours) which may enable the users to interface with the network. In other embodiments, the first subset includes endpoints associated with a first subset of users who interface with the network during a period of time including the first time, the second subset includes endpoints associated with a second subset of users who interface with the network during a period of time including the second time and that does not include the first time. In these and other embodiments, the assessment may be one or two days to ensure that each shift is covered.

At block 710, a second set of assessment indicators may be received. The second set may be received responsive to the second batch endpoint assessment. The second set may be received from one or more or each of the endpoints. The second set may include an indication of a compliance state from the second and the third subsets that are active and an indication of a communicative state from the first subset that is inactive. At block 712, a second device status array may be generated. The second device status array may be based on the second set. The second device status array may indicate the statuses of the endpoints at the second time.

At block 714, a final device status array may be populated. For instance, the final device status array may be populated with the first device status array, or another set of initial data for the endpoints. At block 716, the statuses of the endpoint the final device status array may be deduplicated. In some embodiments, the deduplicating includes comparing the second device status array and the first device status array to identify a compliance state difference between the first batch endpoint assessment and the second batch endpoint assessment. Responsive to the identified compliance state difference of a particular endpoint including a change from a noncompliant state or a non-communicative state to a compliant state, the deduplication may include updating a status of the particular endpoint to the compliant state in the final device status array. Responsive to the identified compliance state difference of the particular endpoint including a change from a compliant state to a noncompliant state or to a non-communicative state, the deduplication may include not updating the status of the particular endpoint in the final device status array. Responsive to the identified compliance state difference of the particular endpoint including a change from a noncompliant state to a non-communicative state or from non-communicative state to a noncompliant state, the deduplication may include updating the status of the particular endpoint to the state at the second time in the final device status array. In some embodiments, blocks 714 and 716 may be operations of generating the final device status array.

At block 718, it may be determined whether an endpoint has a noncompliant state in the final device status array. The determination may be made after the assessment period in some embodiments or following one or more of the batch endpoint assessments. In response to no endpoints having a noncompliant state, ("No" at block 718), the method 700 may end or may proceed to block 702 following which the operations of one or more of blocks 702, 704, 706, 708, 710, 712, 714, 716, and 718 may be performed. In response to a second endpoint having a noncompliant state, ("Yes" at block 718), the method 700 may proceed to block 720. At block 720, noncompliance of the second endpoint may be mitigated. Mitigation may include initiating an action at the second endpoint to change a state of the second endpoint and bring the second endpoint into compliance. In some embodiments, the mitigating includes communicating a patch for installation, modifying a setting at the second endpoint, deleting a file or program on the second endpoint, installing a file or program on the second endpoint, another mitigation action, or combinations thereof.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the embodiments and the concepts contributed to furthering the art and are to be construed as being without limitation to such specifically recited examples and conditions. Although embodiments have been described in detail, various changes, substitutions, and alterations could be made hereto without departing from the scope of the embodiments.

What is claimed is:

1. A method of endpoint compliance evaluation and remediation for a network of endpoints having changing network communication states, the method comprising:
    performing a first batch endpoint assessment at a first time during which a first subset and a third subset of the endpoints are active, and a second subset of the endpoints is inactive;
    responsive to the first batch endpoint assessment, receiving a first set of assessment indicators from each of the endpoints, the first set including an indication of a compliant state from the first subset and the third subset that are active and an indication of a communicative state from the second subset that is inactive;
    generating a first device status array based on the first set, the first device status array indicating statuses of the endpoints at the first time;
    performing a second batch endpoint assessment at a second time, the second time being during an assessment period and following the first time, wherein the second subset and the third subset are active at the second time and the first subset is inactive at the second time;
    responsive to the second batch endpoint assessment, receiving a second set of assessment indicators from each of the endpoints, the second set including an indication of a compliant state from the second and the third subsets that are active and an indication of a communicative state from the first subset that is inactive;

generating a second device status array based on the second set, the second device status array indicating the statuses of the endpoints at the second time;

generating a final device status array, the generating including populating the final device status array with the first device status array;

deduplicating statuses of the endpoints in the first set of assessment indicators and the second set of assessment indicators, wherein the deduplication includes:

comparing the second device status array and the first device status array to identify a compliant state difference between the first batch endpoint assessment and the second batch endpoint assessment; and responsive to the identified compliant state difference of a particular endpoint including a change from a noncompliant state or a non-communicative state to a compliant state, updating a status of the particular endpoint to the compliant state in the final device status array; and after the assessment period:

determining whether a second endpoint has a noncompliant state; and responsive to the second endpoint having the noncompliant state, mitigating the second endpoint by initiating an action at the second endpoint to change a state of the second endpoint and bring the second endpoint into compliance.

2. The method of claim 1, wherein the deduplicating includes responsive to the identified compliant state difference of the particular endpoint including a change from a compliant state to a noncompliant state or to a non-communicative state, not updating a status of the particular endpoint in the final device status array.

3. The method of claim 2, wherein the deduplicating includes responsive to the identified compliant state difference of the particular endpoint including a change from a noncompliant state to a non-communicative state or from non-communicative state to a noncompliant state, updating the status of the particular endpoint to the state at the second time in the final device status array.

4. The method of claim 1, further comprising prior to the first batch endpoint assessment communicating a command to the endpoints to perform an action, wherein the first batch endpoint assessment is configured to determine whether the command is implemented at the endpoints.

5. The method of claim 1, wherein the assessment period includes three days.

6. The method of claim 1, wherein:

the first subset includes endpoints that interface with the network in a first geographic location; and the second subset includes endpoints that interface with the network in a second geographic location that is geographically distinct from the first geographic location.

7. The method of claim 1, wherein:

the first subset includes endpoints associated with a first subset of users who interface with the network during a period of time including the first time; and the second subset includes endpoints associated with a second subset of users who interface with the network during a period of time including the second time and that does not include the first time.

8. The method of claim 1, wherein the mitigating includes one or more or a combination of:

communicating a patch for installation;

modifying a setting at the second endpoint;

deleting a file or program on the second endpoint; and installing a file or program on the second endpoint.

9. One or more computer-readable media configured to cause a system to perform or control operations of endpoint compliance evaluation and remediation for a network of endpoints having changing network communication states, the operations comprising:

performing a first batch endpoint assessment at a first time during which a first subset and a third subset of the endpoints are active, and a second subset of the endpoints is inactive;

responsive to the first batch endpoint assessment, receiving a first set of assessment indicators from each of the endpoints, the first set including an indication of a compliant state from the first subset and the third subset that are active and an indication of a communicative state from the second subset that is inactive;

generating a first device status array based on the first set, the first device status array indicating statuses of the endpoints at the first time;

performing a second batch endpoint assessment at a second time, the second time being during an assessment period and following the first time, wherein the second subset and the third subset are active at the second time and the first subset is inactive at the second time;

responsive to the second batch endpoint assessment, receiving a second set of assessment indicators from each of the endpoints, the second set including an indication of a compliant state from the second and the third subsets that are active and an indication of a communicative state from the first subset that is inactive;

generating a second device status array based on the second set, the second device status array indicating the statuses of the endpoints at the second time;

generating a final device status array, the generating including populating the final device status array with the first device status array;

deduplicating statuses of the endpoints in the first set of assessment indicators and the second set of assessment indicators, wherein the deduplication includes:

comparing the second device status array and the first device status array to identify a compliant state difference between the first batch endpoint assessment and the second batch endpoint assessment; and responsive to the identified compliant state difference of a particular endpoint including a change from a noncompliant state or a non-communicative state to a compliant state, updating a status of the particular endpoint to the compliant state in the final device status array; and after the assessment period:

determining whether a second endpoint has a noncompliant state; and responsive to the second endpoint having the noncompliant state, mitigating the second endpoint by initiating an action at the second endpoint to change a state of the second endpoint and bring the second endpoint into compliance.

10. The computer-readable media of claim 9, wherein the deduplicating includes responsive to the identified compliant state difference of the particular endpoint including a change from a compliant state to a noncompliant state or to a non-communicative state, not updating a status of the particular endpoint in the final device status array.

11. The computer-readable media of claim 10, wherein the deduplicating includes responsive to the identified compliant state difference of the particular endpoint including a change from a noncompliant state to a non-communicative state or from non-communicative state to a noncompliant state, updating the status of the particular endpoint to the state at the second time in the final device status array.

12. The computer-readable media of claim 9, further comprising prior to the first batch endpoint assessment communicating a command to the endpoints to perform an action, wherein the first batch endpoint assessment is configured to determine whether the command is implemented at the endpoints.

13. The computer-readable media of claim 9, wherein the assessment period includes three days.

14. The computer-readable media of claim 9, wherein:
the first subset includes endpoints that interface with the network in a first geographic location; and
the second subset includes endpoints that interface with the network in a second geographic location that is geographically distinct from the first geographic location.

15. The computer-readable media of claim 9, wherein:
the first subset includes endpoints associated with a first subset of users who interface with the network during a period of time including the first time; and
the second subset includes endpoints associated with a second subset of users who interface with the network during a period of time including the second time and that does not include the first time.

16. The computer-readable media of claim 9, wherein the mitigating includes one or more or a combination of:
communicating a patch for installation;
modifying a setting at the second endpoint;
deleting a file or program on the second endpoint; and
installing a file or program on the second endpoint.

* * * * *